(12) United States Patent
Dittmer

(10) Patent No.: US 7,983,358 B2
(45) Date of Patent: Jul. 19, 2011

(54) COMPOSITE CREST FACTOR REDUCTION

(75) Inventor: Timothy Wilfred Dittmer, Mason, OH (US)

(73) Assignee: Harris Corporation, Melbourne, FL (US)

( * ) Notice: Subject to any disclaimer, the term of this patent is extended or adjusted under 35 U.S.C. 154(b) by 108 days.

(21) Appl. No.: 12/229,430

(22) Filed: Aug. 22, 2008

(65) Prior Publication Data

US 2008/0317163 A1 Dec. 25, 2008

Related U.S. Application Data

(63) Continuation of application No. 11/168,705, filed on Jun. 28, 2005, now abandoned.

(51) Int. Cl.
*H04L 25/49* (2006.01)

(52) U.S. Cl. ........ 375/296; 375/295; 375/254; 375/278; 375/284; 375/285; 398/193; 455/91; 455/114.2; 455/114.3

(58) Field of Classification Search .......... 375/296, 375/295, 254, 278, 284, 285; 370/206; 398/193; 455/91, 114.2, 114.3
See application file for complete search history.

(56) References Cited

U.S. PATENT DOCUMENTS

| | | | |
|---|---|---|---|
| 6,125,103 A | 9/2000 | Bauml et al. | |
| 6,198,778 B1 | 3/2001 | Mestdagh | |
| 6,430,227 B1 * | 8/2002 | Kroeger et al. | ........... 375/260 |
| 6,512,797 B1 | 1/2003 | Tellado et al. | |
| 6,529,925 B1 | 3/2003 | Schenk | |
| 7,085,330 B1 | 8/2006 | Shirali | |
| 2004/0052314 A1 | 3/2004 | Copeland | |
| 2004/0156442 A1 | 8/2004 | Clausen | |
| 2005/0169411 A1 * | 8/2005 | Kroeger | ........... 375/350 |

OTHER PUBLICATIONS

Ryu et al. Papr Reduction Using Soft Clipping and AI Rejection in OFDM Systems; Consumer Electronics, IEEE Transactions on; Publication Date: Feb. 2002; vol. 48, Issue 1; pp. 17-22.

* cited by examiner

*Primary Examiner* — Chieh M Fan
*Assistant Examiner* — Leila Malek
(74) *Attorney, Agent, or Firm* — Tarolli, Sundheim, Covell & Tummino LLP

(57) ABSTRACT

Systems and methods are provided for providing a hybrid signal having a reduced crest factor. A digital signal is generated that assumes one of a plurality of vector states at discrete sampling times, with each of the plurality of vector states having an associated phase. An analog signal is monitored to determine when a phase of the analog signal is aligned with the phase of a vector state assumed by the digital signal. A crest factor reduction is applied to the digital signal if the digital signal assumes a vector state having an associated phase aligned with the phase of the analog signal to provide a compressed digital signal. The compressed digital signal and the analog signal are combined to provide the hybrid signal. The analog signal is not altered prior to being combined with the compressed digital signal.

16 Claims, 3 Drawing Sheets

COMPOSITE CREST FACTOR REDUCTION

RELATED APPLICATIONS

This application is a continuation of application Ser. No. 11/168,705, which was filed Jun. 28, 2005 now abandoned and titled "COMPOSITE CREST FACTOR REDUCTION." The entire contents of that application are hereby incorporated by reference.

TECHNICAL FIELD

The present invention relates to RF communication systems and is particularly directed to systems and methods for producing a hybrid signal having a reduced crest factor.

BACKGROUND OF THE INVENTION

The In Band On Channel (IBOC) digital audio broadcasting system proposed for usage in the USA places new requirements on broadcast transmitters. Foremost among these is linearity, due to the fact IBOC digital audio modulation has amplitude components. The depth of this amplitude modulation contributes significantly to the cost of transmitter design, as it is necessary to provide adequate headroom and linearity over the entire range of amplitude. Accordingly, it is desirable to reduce this range, a process referred to as crest factor reduction.

A digitally modulated signal is required to arrive at certain vector states (e.g., signal envelope amplitude and phase) at various digital sampling times within the signal. To the degree that the signal deviates from these states, symbol detection errors can occur at an associated receiver. The extent of the crest factor reduction is generally limited by the expected tolerance of associated receivers for the distortion of the vector states. The distortion can be caused by direct compression at the symbol times, or indirectly as a result of compressing the signal between sampling times.

In one example, a hybrid signal can include a frequency modulated analog signal and a digital component. The digital signal transitions between a plurality of possible vector states of the digital component between discrete sample times associated with the hybrid signal, such that the digital signal assumes one of the plurality of vector states at each sample time. It will be appreciated that during these transitions, the hybrid signal can assume amplitudes significantly greater than its amplitude at the individual vector states. This results in an increased crest factor (i.e., Peak-to-average power ratio) of the signal, which is undesirable. Previous attempts to reduce the crest factor of a hybrid signal have caused distortion of the vector states of the signal, resulting in signal errors. Accordingly, the extent of crest factor reduction possible for a given signal is limited by the amount of distortion that is allowable for a given application, as well as by spectral regrowth constraints.

SUMMARY OF THE INVENTION

In accordance with an aspect of the present invention, a method is provided for providing a hybrid signal having a reduced crest factor. A digital signal is generated that assumes one of a plurality of vector states at discrete sampling times, with each of the plurality of vector states having an associated phase. An analog signal is monitored to determine when a phase of the analog signal is aligned with the phase of a vector state assumed by the digital signal. A crest factor reduction is applied to the digital signal if the digital signal assumes a vector state having an associated phase aligned with the phase of the analog signal to provide a compressed digital signal. The compressed digital signal and the analog signal are combined to provide the hybrid signal. The analog signal is not altered prior to being combined with the compressed digital signal.

In accordance with another aspect of the present invention, a system is provided for producing a hybrid signal having a reduced crest factor. A digital exciter produces a digital signal that assumes one of a plurality of vector states at discrete sampling times associated with the digital signal. Each of the plurality of vector states has an associated phase. A limiting system is configured to monitor an analog signal to determine phase alignment of the analog signal relative to the vector state assumed by the digital signal and apply a crest factor reduction to the digital signal if the digital signal assumes a vector state having an associated phase aligned with the phase of the analog signal to provide a compressed digital signal. A signal combiner receives the analog signal in unaltered form as well as the compressed digital signal and combines the analog signal and the compressed digital signal to produce the hybrid signal.

BRIEF DESCRIPTION OF THE DRAWINGS

The foregoing and other features of the present invention will become apparent to those skilled in the art to which the present invention relates upon consideration of the following description of the invention with reference to the accompanying drawings, wherein.

DESCRIPTION OF THE PREFERRED EMBODIMENT

Figure 1:
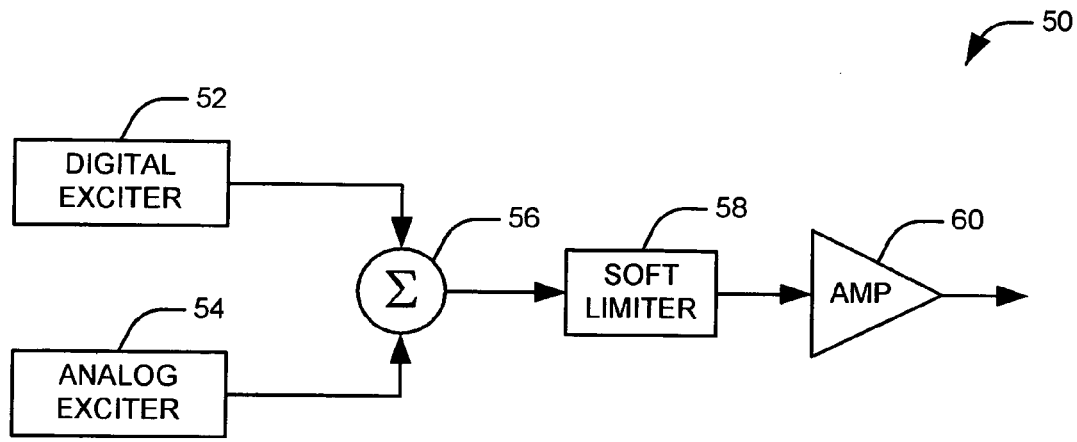
FIG. 1 is a functional block diagram of a system for applying a composite crest factor reduction to a hybrid signal.

FIG. 1 is a functional block diagram of a system 50 for applying a composite crest factor reduction to a hybrid signal. A digital component of the hybrid signal is provided by a digital exciter 52. The digital exciter 52 can include, for example, appropriate components for encoding one or more analog signals as streams of digital data, multiplexing the data streams into a digital signal, and coding the digital signal for forward error correction. In an exemplary implementation, the digital exciter 52 produces a digital signal modulated via quadrature phase shift keying to carry desired information, such as digital audio.

An analog exciter 54 provides a frequency modulated (FM) analog signal. The analog exciter 54 can include a voltage controlled oscillator or a similar device for imposing a frequency modulation on a carrier signal. The FM analog signal is combined with the digital signal at a signal combiner 56. The signal combiner 56 multiplexes the analog and digital signals into a hybrid signal in such a way as to avoid interference between the two signals. In an exemplary implementation, the signal combiner 56 sums the two signals.

The hybrid signal is subjected to a limiting function to compress any signal peaks above a desired amplitude. This limiting function is represented in the illustrated example as a soft limiter 58, but it will be appreciated that the actual limiting function can be applied to the hybrid signal through a variety of means. For example, the digital signal can be predistorted as to limit the expected amplitude of the hybrid signal, by monitoring the analog signal and performing appropriate calculations of hybrid signal amplitude. Similarly, an amplifier 60 within the system 50 can be selected to provide some or all of the limiting function to the signal. By limiting the hybrid signal, the digital component to the signal can be significantly limited only when necessary to avoid a signal peak, namely, at those points wherein the phase of the digital component aligns with the phase of the analog signal. It will be appreciated that the soft limiter 58 can also limit the signal a minimal amount even when the phase of the digital signal does not align with the analog signal. Once the hybrid signal has been limited, it is amplified at the amplifier 60 and provided to an associated transmitter (not shown).

Figure 2:
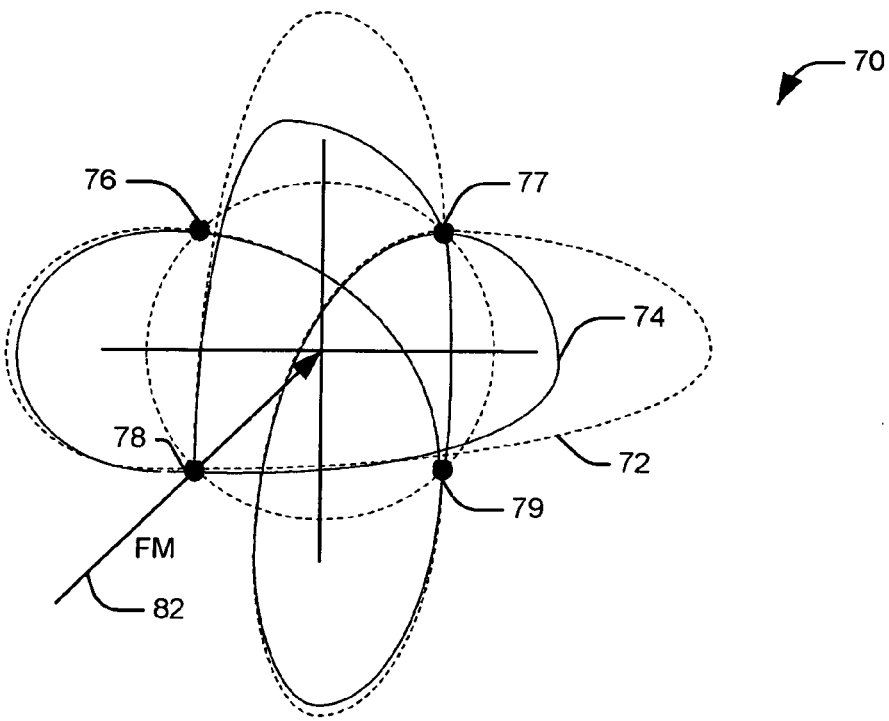
FIG. 2 illustrates a signal constellation diagram of an exemplary output from the system illustrated in FIG. 1.

FIG. 2 illustrates a signal constellation diagram 70 of an uncompressed hybrid signal 72 and an exemplary hybrid signal 74 output from the system 50 illustrated in FIG. 1. The diagram includes four constellation points 76-79 representing four vector states that can be assumed by the digital components of the hybrid signal 72 and 74. It will be appreciated that the peak amplitudes of the exemplary hybrid signal 74 during transitions between the various vector states has been reduced maximally relative to the signal peaks of the uncompressed signal when the digital signal is in-phase with the analog FM signal 82. This reduction is a direct consequence of the selective compression of the signal imposed by the crest factor reduction system. The compression at other phase values of the digital signal is minimal, reaching a minimum value when the digital signal is directly out of phase with the analog signal and varying between a minimum level and a maximum level as the phase of the digital signal varies. Accordingly, a superior crest factor is maintained relative to the prior art, without introducing significant vector state distortion into the signal.

Figure 3:
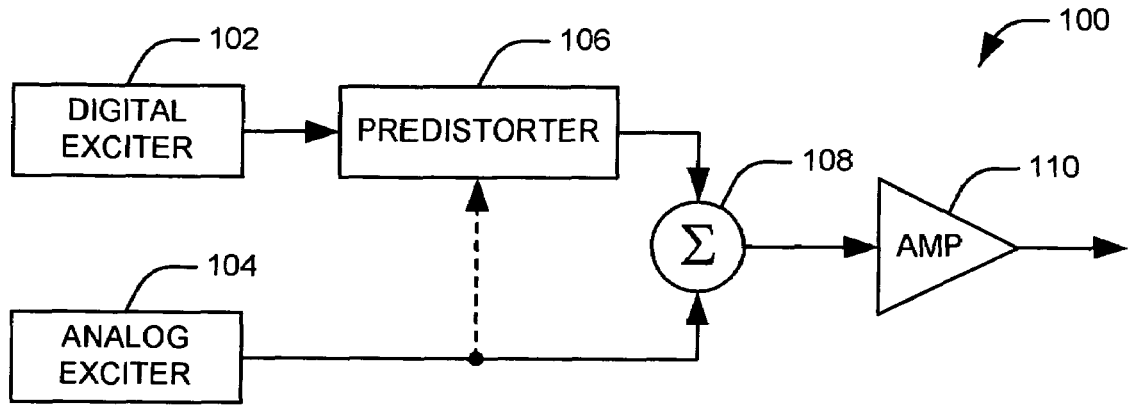
FIG. 3 is a functional block diagram of an exemplary implementation of a system for applying a composite crest factor reduction to a hybrid signal.

FIG. 3 is a functional block diagram of an exemplary implementation of a system 100 for applying a composite crest factor reduction to a hybrid signal. A digital component of the hybrid signal is provided by a digital exciter 102. In the illustrated example, the digital component is generated via a quadrature phase shift keying modulation scheme, such that the digital component can assume any of four vector states, each having a different associated phase value. An analog component of the hybrid signal, having an associated phase, is produced at an analog exciter 104. In the illustrated example, the analog component is a frequency modulated (FM) analog signal.

The digital signal component is predistorted at a digital predistorter 106 to reduce the amplitude of the signal when the digital component assumes a vector state that is in-phase with the analog carrier signal. The digital predistorter 106 selectively compresses the digital component to produce a hybrid signal having a reduced crest factor. The predistorted digital signal is combined with the analog signal at a multiplexer 108 to produce the hybrid signal. The hybrid signal is then amplified at a power amplifier 110. Additional compression can be applied to the hybrid signal at the power amplifier 110 to further limit the crest factor of the hybrid signal.

Figure 4:
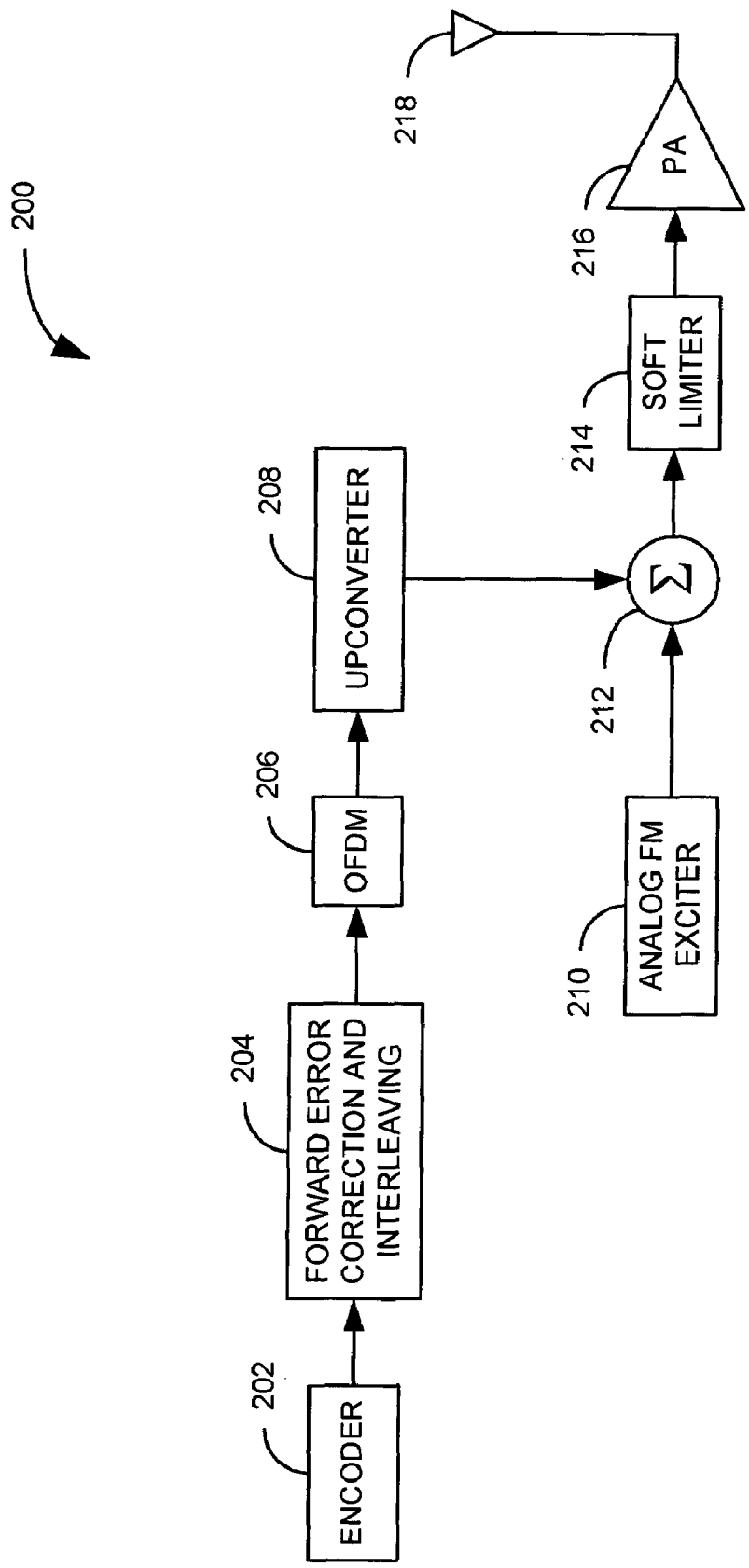
FIG. 4 is a functional block diagram of an exemplary digital audio broadcast system utilizing composite crest factor reduction in accordance with an aspect of the present invention.

FIG. 4 is a functional block diagram of an exemplary digital audio broadcast (DAB) system 200 utilizing composite crest factor reduction in accordance with an aspect of the present invention. The transmitter system 200 comprises an encoder 202 that encodes an analog source signal into a digital audio signal. The digital signal is encoded as a quadrature phase shift keying (QPSK) such that a plurality of two-bit symbols are encoded as one of four vector states, each having an associated phase. The audio encoder 202 removes redundant information from the audio signal to reduce the bit rate and thus the bandwidth required to transmit the signal.

The compressed bit stream is then provided to a forward error correction and interleaving component 204. The forward error correction and interleaving component 204 codes the signal for later error correction to improve the reliability of the information transmitted in the digital signal. The forward error coding can include, for example, Reed-Solomon encoding and Trellis coding. The data interleaving spreads related data over time and frequency to mitigate the effects of burst errors in the transmitted signal. The coded signal is then provided to an orthogonal frequency division multiplexer 206 that assigns the interleaved data to various orthogonal subchannels and combines the subchannels into a modulated signal. This signal is then provided to an upconverter 208 that upconverts the signal to a radio frequency.

An analog exciter 210 produces a frequency modulated analog signal from an analog carrier signal having an associated phase. The frequency modulated analog signal and the coded signal are provided to a multiplexer 212. The multiplexer 212 combines the two signals to form a hybrid signal. The signals are combined in such a way as to minimize interference between the signals. The hybrid signal is provided to a soft limiter 214.

The soft limiter 214 compresses the hybrid signal as to limit its maximum amplitude. Effectively, the soft limiter 214 compresses the hybrid signal maximally when it is at its peak amplitude, which occurs wherever the digital signal and the analog signal are in phase. In an exemplary embodiment, the soft limiter can be implemented as a limiter and a band pass filter. These elements can be cascaded repeatedly to improve the performance of the soft filter. It will be appreciated that this can be accomplished by other means, such as predistorting the digital signal as to reduce its amplitude when the digital signal is in phase with the analog carrier.

The signal is then provided to a power amplifier 216. The power amplifier 216 amplifies the signal to an appropriate level for transmission and provides the signal to an associated antenna 218. In an exemplary implementation, the power amplifier 216 can provide some or all of the signal compression, supplementing or replacing the soft limiter 214.

Figure 5:
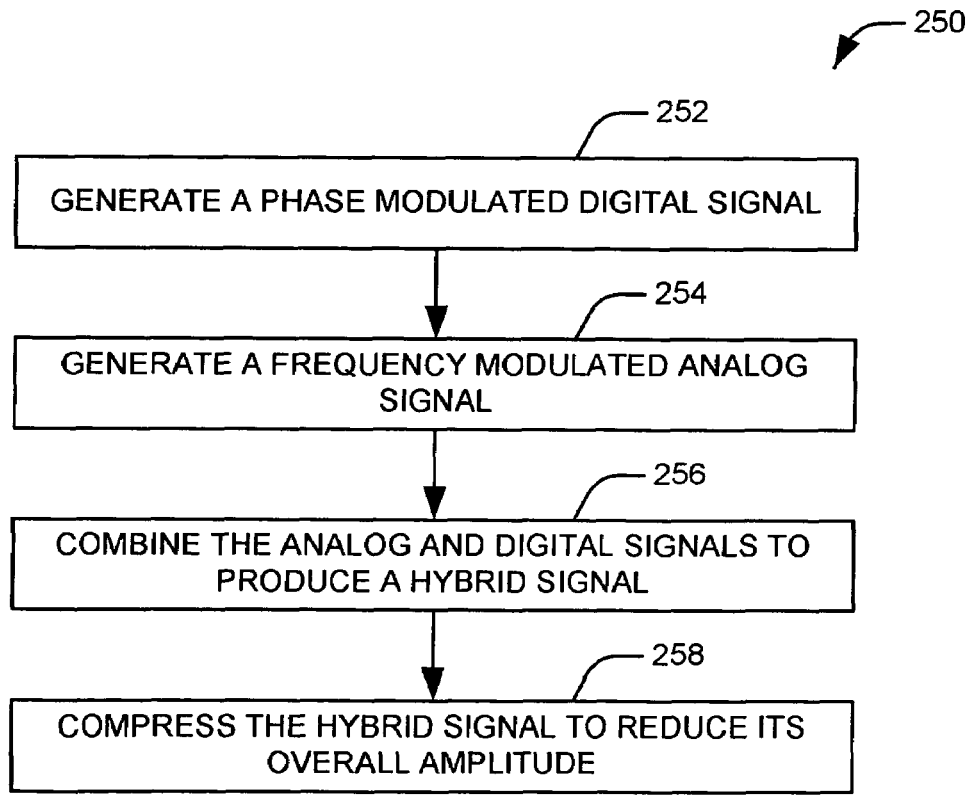
FIG. 5 is a flow diagram of a methodology for providing a hybrid signal having a reduced crest factor.

In view of the foregoing structural and functional features described above, a methodology in accordance with various aspects of the present invention will be better appreciated with reference to FIG. 5. While, for purposes of simplicity of explanation, the methodology of FIG. 5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 5 is a flow diagram of a methodology 250 for providing a hybrid signal having a reduced crest factor. The methodology 250 begins at step 252, where a digital signal is generated. The digital signal is phase modulated, such that the signal assumes one of a plurality of discrete phase states at each of a plurality of sampling times. For example, the signal can be modulated via quadrature phase shift keying.

At step 254, a frequency modulated analog signal is generated. At step 256, the analog signal and the digital signal are combined to form a hybrid signal. The signals are generated and combined as to avoid interference. The hybrid signal is compressed at step 258 to limit the crest factor of the hybrid signal. For example, the hybrid signal can be limited at a soft limiter or an amplifier, or the digital signal can be predistorted to reduce its amplitude when it assumes the same phase as the analog carrier. The compressed signal can then be amplified and broadcast.

From the above description of the invention, those skilled in the art will perceive improvements, changes and modifications in the invention. Such improvements, changes and modifications within the skill of the art are intended to be covered by the appended claims.

Having described the invention I claim:

1. A method for providing a hybrid signal having a reduced crest factor comprising:
    generating a digital signal that assumes one of a plurality of vector states at discrete sampling times, each of the plurality of vector states having an associated phase;
    monitoring an analog signal to determine when a phase of the analog signal is aligned with the phase of a vector state assumed by the digital signal;
    applying a crest factor reduction to the digital signal if the digital signal assumes a vector state having an associated phase aligned with the phase of the analog signal to provide a compressed digital signal; and
    combining the compressed digital signal and the analog signal, the analog signal being unaltered prior to being combined with the compressed digital signal, to provide the hybrid signal.

2. A method as set forth in claim 1, wherein the digital signal is modulated via quadrature phase shift keying.

3. A method as set forth in claim 1, wherein the amplitude of the digital signal is reduced by a maximum amount when the digital signal assumes a vector state that is in-phase with the analog signal, reduced by a minimal amount when the digital signal assumes a vector state that is directly out of phase with the analog signal, and reduced by a variable amount, ranging inclusively from the minimum amount to the maximum amount, when the digital signal assumes a vector state that is neither in-phase nor directly out-of-phase with the analog signal.

4. A method as set forth in claim 1, further comprising providing the hybrid signal to a soft limiter that compresses amplitude peaks associated with the hybrid signal.

5. A method as set forth in claim 1, further comprising providing forward error correction to the digital signal, the forward error correction being provided prior to the step of reducing the amplitude of the digital signal.

6. A method as set forth in claim 5, wherein providing forward error correction to the digital signal includes applying Trellis coding to the digital signal.

7. A method as set forth in claim 5, wherein providing forward error correction to the digital signal includes applying Reed-Solomon encoding to the digital signal.

8. A method as set forth in claim 1, wherein generating an analog signal comprises generating a frequency modulated analog signal.

9. A system for producing a hybrid signal having a reduced crest factor, comprising:
    a digital exciter that produces a digital signal that assumes one of a plurality of vector states at discrete sampling times associated with the digital signal, each of the plurality of vector states having an associated phase;
    a limiting system configured to monitor an analog signal to determine phase alignment of the analog signal relative to the vector state assumed by the digital signal and apply a crest factor reduction to the digital signal if the digital signal assumes a vector state having an associated phase aligned with the phase of the analog signal to provide a compressed digital signal; and
    a signal combiner that receives the analog signal in unaltered form and the compressed digital signal and combines the analog signal and the compressed digital signal to produce the hybrid signal.

10. A system as set forth in claim 9, wherein the digital exciter comprises a modulator configured to provide a digital signal modulated via quadrature phase shift keying.

11. A system as set forth in claim 9, wherein the analog exciter comprises a frequency modulation (FM) analog exciter.

12. A system as set forth in claim 9, wherein the limiting system reduces the amplitude of the digital signal by a maximum amount when the digital signal assumes a vector state that is in-phase with the analog signal, reduces the amplitude by a minimal amount when the digital signal assumes a vector state that is directly out of phase with the analog signal, and reduces the amplitude by a variable amount, ranging inclusively from the minimum amount to the maximum amount, when the digital signal assumes a vector state that is neither in-phase nor directly out-of-phase with the analog signal.

13. A system as set forth in claim 9, further comprising a soft limiter that compresses amplitude peaks associated with the hybrid signal.

14. A system as set forth in claim 9, wherein the digital exciter comprises a forward error correction component that is configured to provide forward error correction to the digital signal.

15. A system as set forth in claim 14, wherein the forward error correction component is configured to apply Trellis coding to the digital signal.

16. A system as set forth in claim 14, wherein the forward error correction component is configured to apply Reed-Solomon encoding to the digital signal.

* * * * *